June 17, 1930.  M. KOUSMINSKY  1,765,277
PHOTOGRAPHIC REPRODUCING APPARATUS
Filed Jan. 4, 1928  4 Sheets-Sheet 1

INVENTOR
Mascha Kousminsky
BY
ATTORNEY

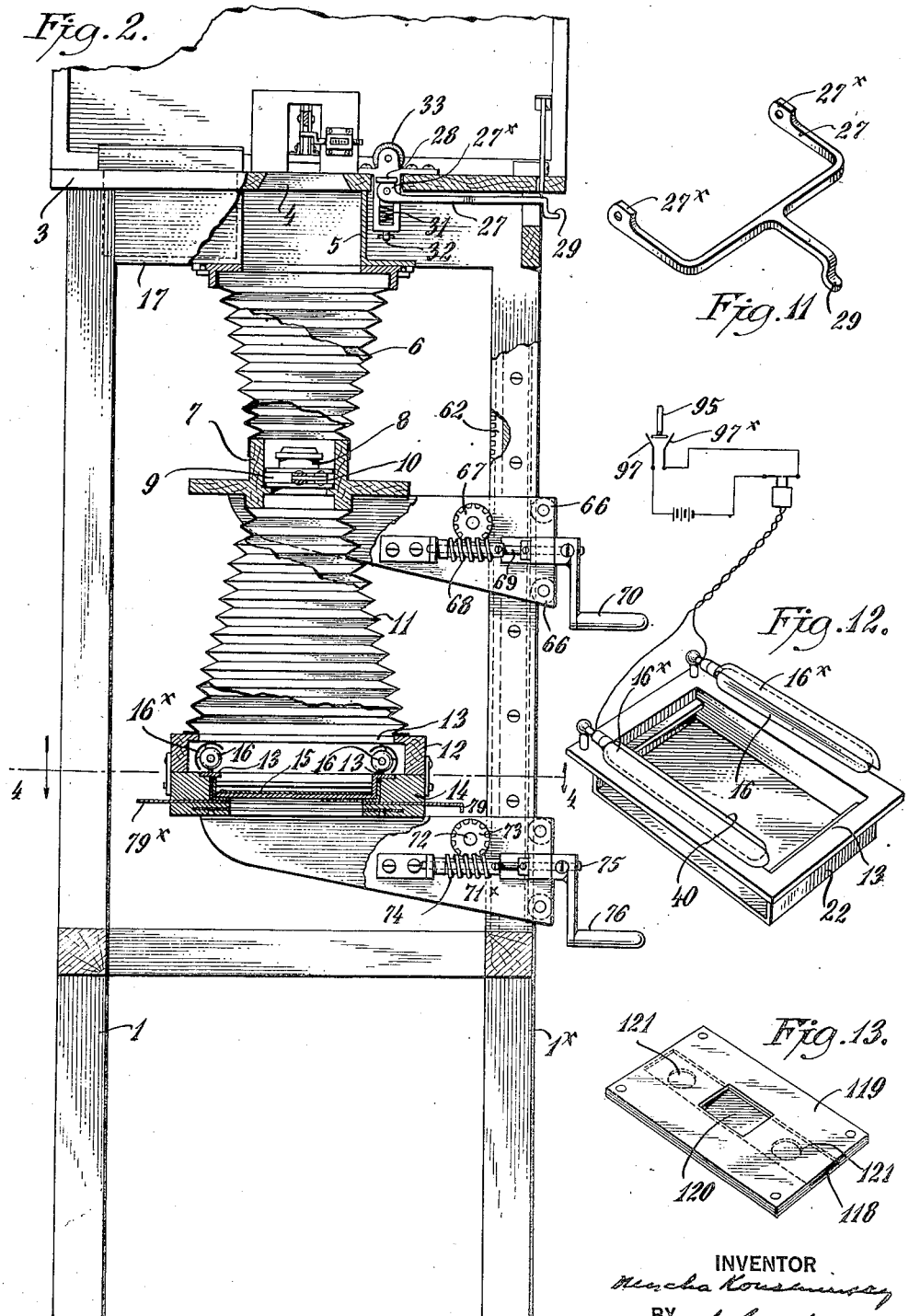

June 17, 1930. M. KOUSMINSKY 1,765,277
PHOTOGRAPHIC REPRODUCING APPARATUS
Filed Jan. 4, 1928 4 Sheets-Sheet 3
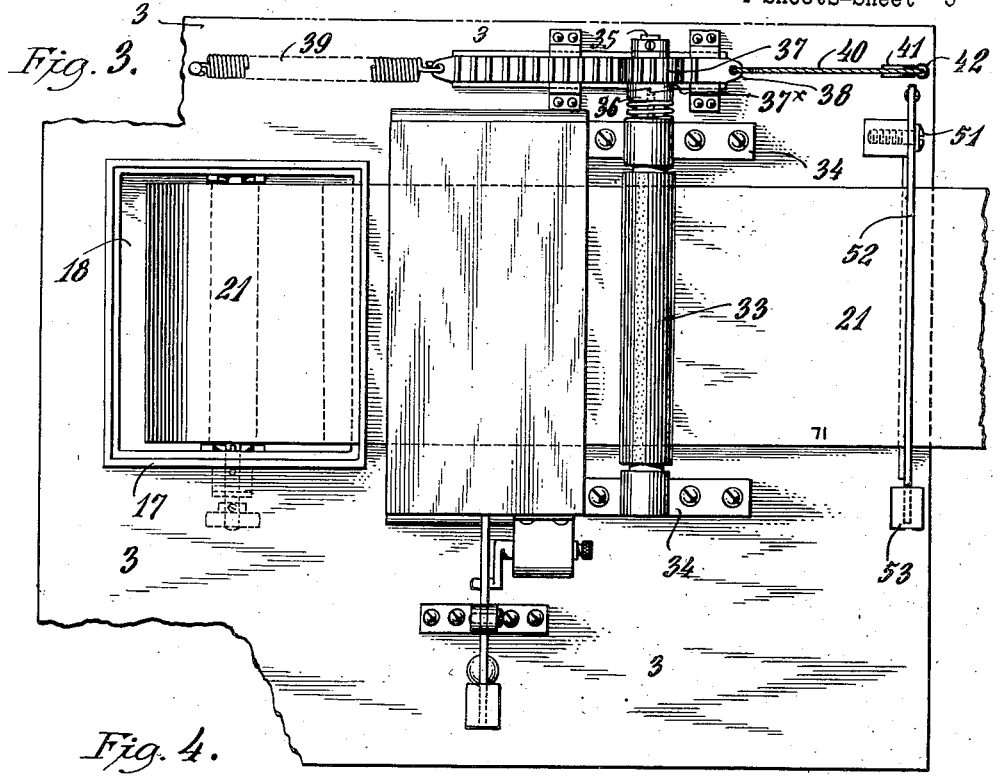
Fig. 3.
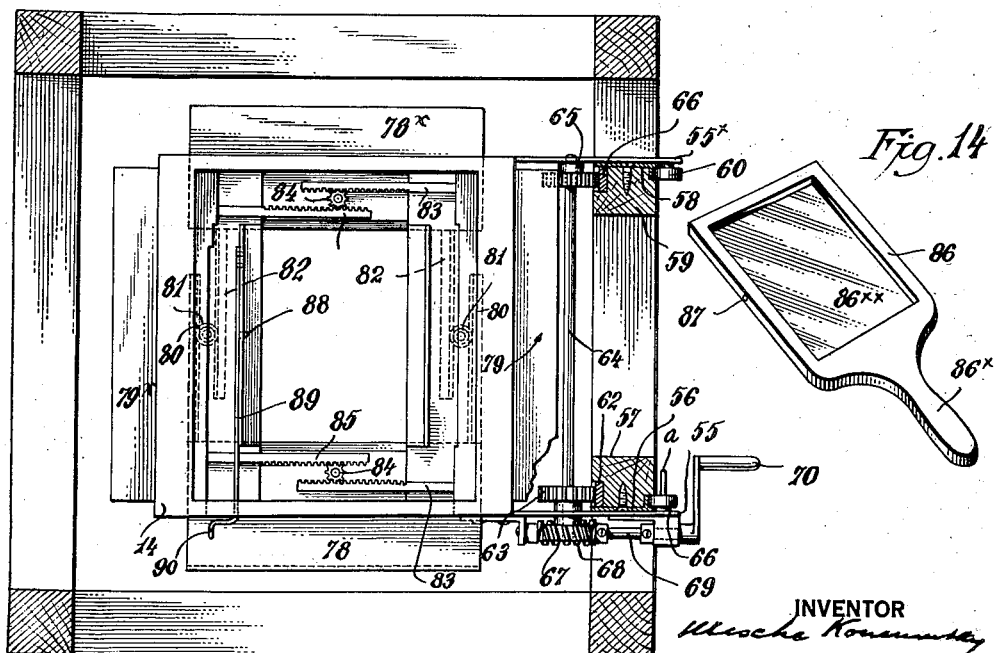
Fig. 4.
Fig. 14
INVENTOR
BY
ATTORNEY

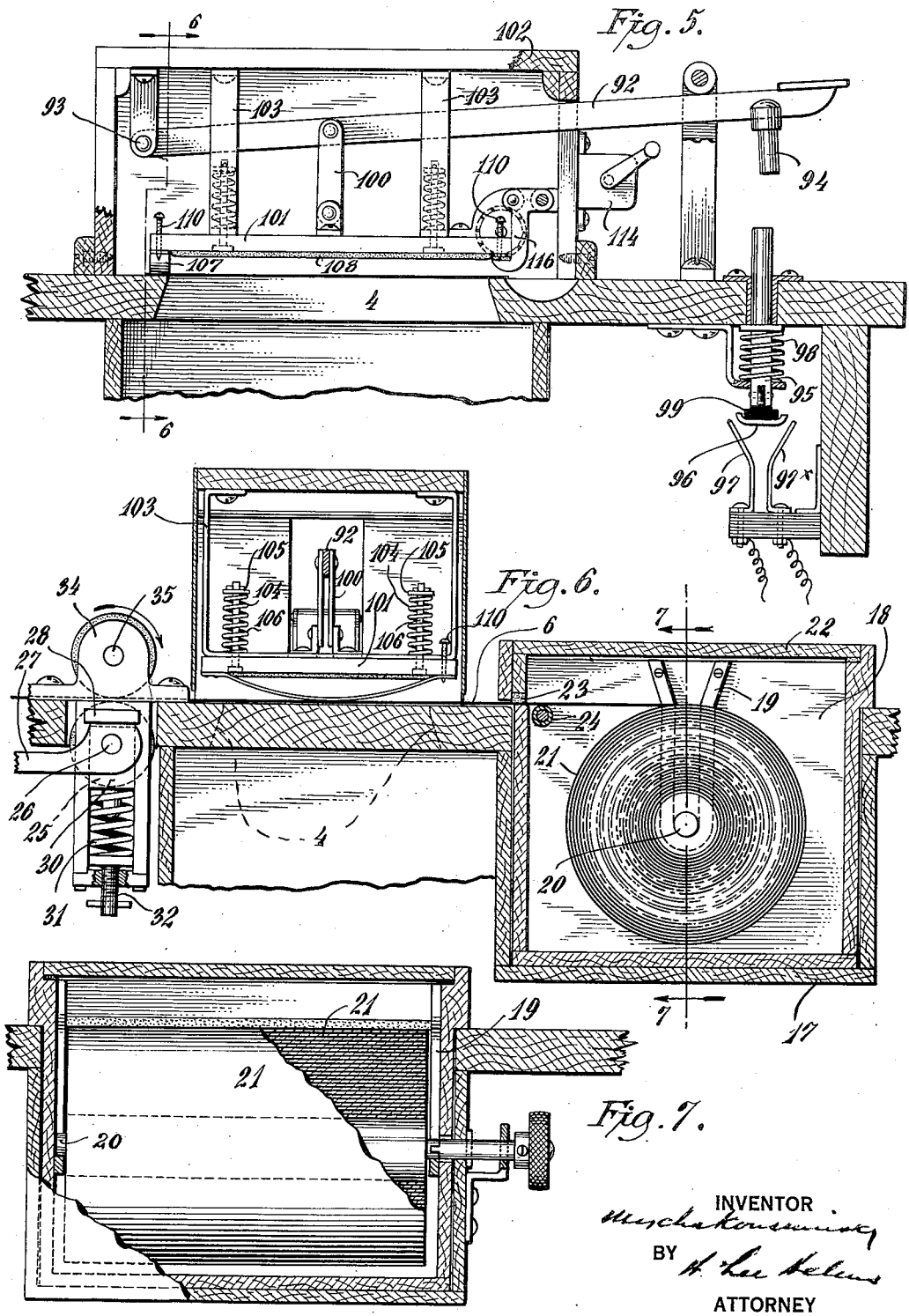

Patented June 17, 1930

1,765,277

UNITED STATES PATENT OFFICE

MISCHA KOUSMINSKY, OF NEW YORK, N. Y., ASSIGNOR TO ANATOL M. JOSEPHO, OF NEW YORK, N. Y.

PHOTOGRAPHIC REPRODUCING APPARATUS

Application filed January 4, 1928. Serial No. 244,388.

The object of the present invention is to provide a photographic reproducing apparatus adapted to reproduce by enlargement, reduction or normal size a picture of any kind by reflection and a film image by projection, the elements being so designed and co-related to facilitate such reproduction and perform it accurately and enable duplication of the reproductions rapidly.

The invention will be described with reference to the accompanying drawings, in which—

Figure 2 is a view in elevation of the right side of the apparatus, certain parts being shown in section;

Figure 3 is a plan view of the apparatus;

Figure 4 is a horizontal section on the line 4—4, Figure 2;

Figure 5 is a detail sectional elevation of the combined lighting switch and sensitized sheet clamping means at the top of the apparatus;

Figure 6 is a transverse sectional elevation on the line 6—6, Figure 5;

Figure 7 is a sectional elevation on the line 7—7, Figure 6;

Figure 11 is a perspective view of the lower feed roll holder;

Figure 12 is a view of the illuminating frame employed for pictures on opaque sheets;

Figure 13 is a perspective view of a holder for narrow picture strips, and

Figure 14 is a perspective view of the film holder.

Figure 1:
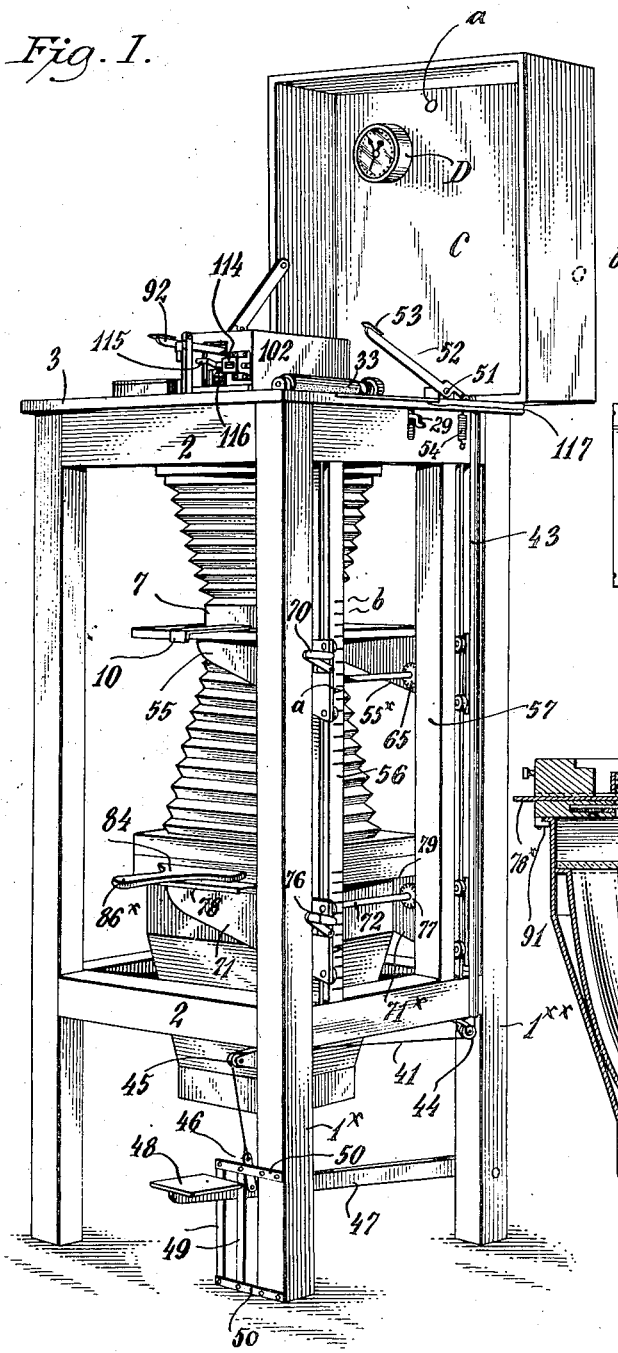
Figure 1 is a perspective view of an embodiment of the invention.
Figure 10:
Figure 10 is a plan view of one of the sensitized and exposed units after severance from the sheet.

The apparatus comprises a supporting table having the legs 1, 1$^x$, 1$^{xx}$, horizontal frame members 2 and the horizontal supporting top 3. The member 3 is provided with an image opening 4 surrounded by the neck 5 of a bellows 6, the lower end of the bellows being connected to a lens support 7, the latter carrying a lens 8. At 9 is indicated a mounting for carrying any suitable type of constantly open shutter, the only requirement being that the opening in the shutter be adjustable. For this purpose an adjusting arm 10 (Fig. 1) may be employed. Lens support 7 at its lower end is connected to a bellows 11, at the lower end of which is a rectangular bellows frame 12.

When it is desired to reproduce pictures printed upon or otherwise carried by opaque sheets, such sheets are placed in the illuminating frame as shown in Figure 12. This frame has horizontal flanges 13 adapted to lie in a shallow rectangular depression formed in negative frame 14. The sheet bearing the picture may lie upon the horizontal bottom wall of the illuminating frame, one of such picture sheets being indicated at 15, Figure 2. The flanges 13 of the illuminating frame may support lamps 16 each having a reflector 16$^x$ for throwing the light down upon the picture sheet. The image is thus thrown, by reflection, upwardly through the shutter opening and through the focusing lens 9, thence through image opening 4 upon a sensitized body such as the sheet now to be described.

Carried by table member is a holder 17 which, in the present instance, is depressed below the top of the table. Holder 17 is adapted to receive a removable box 18, having at opposite sides shaft receiving trough members 19 for the shaft 20 of a roll of sensitized material in sheet form indicated at 21. Box 18 may have a removable cover 22 and a slot 23 for the passage of the strip. A guide roll 24 may lie under the strip near the point of its emergence from the box. The strip passes over image opening 4 and thence over a feed roll 25 (Figure 6), the feed roll being on a shaft 26 carried by a roll releasing member which is shown in detail in Figure 11, the member being indicated at 27. Roll releasing member comprises spaced parallel arms, each arm having a cam member 27$^x$ adapted to bear upon a fixed contact member 28. A finger piece 29 is provided for the roll releasing member.

Shaft 26 passes through bearing blocks 30, one block being disposed adjacent each cam member 27 and each block being engaged by a spring 31, the compression of which is regulated by an adjusting screw 32. The arrangement is such that when finger piece 29 is depressed, cam members $27^x$ are thrown against fixed contacts 28 and shaft 26 is depressed against the tension of spring 31, thus carrying roll 25 downwardly.

When roll 25 is brought downwardly, the sensitized sheet 21 may be passed over the lower roll and under upper roll 33. Upper roll 33 is mounted in the bearing bosses of opposed brackets 34 and its shaft 35 carries at one end a ratchet disk 36 adapted to be engaged by the ratchet end $37^x$ of a pinion 37. Pinion 37 is adapted for engagement with a rack 38 which is held in normal position by means of a spring 39 and is adapted to be moved endwise by cable 40. Cable 40 is led over a pulley 41 and thence downward through an opening 42 in table member 3. The cable passes through a guide tube 43, thence over a pulley 44 to the front of the apparatus and thence over a pulley 45 to a connection 46 with an operating lever 47, having a foot pedal 48, the lever being guided by vertical bars 49 secured by arms 50 to leg $1^x$.

It will thus be seen from the above description that foot pressure upon pedal 48 will rock lever 47 and impart endwise movement to rack 38 through cable 40. The length of this movement may be adjusted by providing means for changing the effective length of movement of lever 47.

In the position of the elements in Figure 3 a movement of cable 40 to the right imparts a similar movement to rack 48 and pinion 37 is rotated to the left thus causing a positive engagement between the ratchet disks and consequent rotation of roll 33. This movement will carry sensitized strip 21 to the right a distance proportionate to the rotation of roll 33. When the cable is released, however, disk 37 will be rotated idly without affecting disk 36 or roll 33.

Referring again to Figure 3 it will be seen that at the right hand end of table member 3 there is pivoted at 51 a knife blade 52 having a finger piece 53, the parts being illustrated in perspective, Figure 1. Thus when the exposed portion of the sheet has been fed past the knife, the latter may be actuated to sever such portion from the sheet. The knife may be held in upper inactive position by means of a light spring 54.

Lens support 7 is carried by spaced arms 55, $55^x$, the first arm lying against a vertical plate 56 carried by supporting bar 57 and the second arm $55^x$, lying adjacent a plate 58 carried by vertical bar 59. Arm $55^x$ carries a roll 60 running on a flanged extension of plate 58 and arm 55 carries a roll 61 adapted to run on a flanged extension of plate 56. On the inner face of bar 57 is a vertical rack 62 engaged by a pinion 63 on a shaft 64. Shaft 64 carries a second pinion 65 engaging a rack 66 carried by a vertical bar 59. Exterior of plate 55 shaft 64 carries a worm wheel 67 engaged by a worm 68 on a shaft 69 operable by crank 70. Plate 55 carries a pointer $a$ adapted to register with a scale $b$ on bar 56.

Negative frame 14 is carried by spaced arms and is given vertical movements exactly in the same manner as the lens support 7. The supporting arms for the negative frame are indicated at 71, $71^x$, Figure 1. Arms 71, $71^x$ support a shaft 72 which carries a worm wheel 73, Fig. 2, engaged by a worm 74 on a shaft 75 operable by a handle 76. Shaft 72 also carries a pinion (not shown) in engagement with rack 62 and a second pinion 77 in engagement with rack 66. The arm 71 carries guide rolls in engagement with the above described trackways on the racks 62, 66. By rotating handle 76 the negative frame may be adjusted relatively to the focusing lens.

Figure 8:
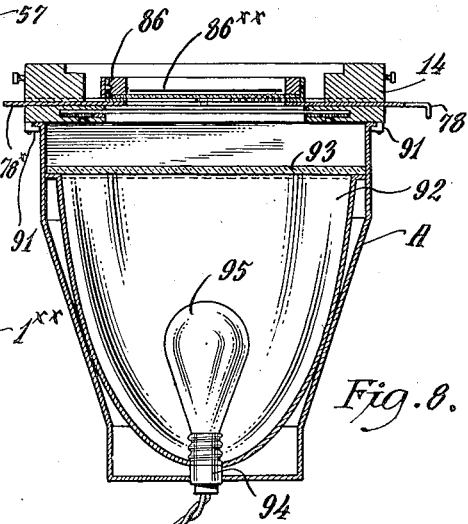
Figure 8 is a sectional elevation through the enlarging lamp-house, negative frame and film holder.

The negative frame is best shown by the sectional view, Figure 8, and the plan view, Figure 4. It comprises a rectangular frame indicated generally by the numeral 14 having opposed horizontal slots for the adjusting plates 78, $78^x$ and, at right angles thereto, opposed slots for the reception of the adjusting plates 79, $79^x$. Plate 78 carries opposed racks 80 connected by pinions 81 with racks 82, carried by plate $78^x$. Thus movement of plate 78 will be communicated to plate $78^x$, and inward movement of one plate imparting the same movement to the other. Adjusting plate 79 carries racks 83 connected by pinions 84 with racks 85 carried by adjusting plate $79^x$. Thus movement of plate 79 inwardly will impart a similar movement to plate $79^x$ and vice versa. The negative frame also has a suitable opening to receive a film holder 86 having a handle $86^x$, the frame of the film holder having a side depression 87 so that when the holder is inserted within the negative frame it is pushed forwardly until a depression is entered by eccentric pin 88 carried by a spring bar 89. The bar may be given a slight movement to withdraw the pin by rocking it through crank 90. The film holder has a transparent base $86^{xx}$ to receive a film or plate and when a film is used it may be covered by a second glass plate as customary, in order to hold it flat.

It will be seen by reference to Figure 8 that the film holder rests on or above adjusting plates 78, $78^x$, 79, $79^x$. The adjusting plates control the size of the area for the passage of the light rays from the lamp house to the film or plate holding the image.

It will be seen that the table 3 is provided with a cover member C which, when in position, shields the members carried by the table from subjection to light. Box-like enclosure 102 may have an opening in register with a switch lever 92 pivoted at 93. Switch lever 92 carries a stud 94 adapted to engage the upper end of a rod 95, which passes through table 3 and carries at its lower end a switch closing shoe 96 adapted to bridge contacts 97, 97× and thereby close the circuit through lamps 16, when the enlargement is through reflection from the illuminating frame illustrated in Figure 12, or to close the circuit through lamp 95 (Figure 8) when the enlargement is by projection through a transparent film or plate held in negative frame 14. Rod 95 is held upwardly through the action of spring 98 and shoe 96 is insulated by insulation 99.

Switch lever 92 is connected by a link 100 with a pressure plate 101. This pressure plate is normally held upwardly through the following means:—

Figure 9:
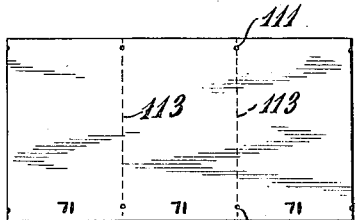
Figure 9 is a plan view of a portion of the sensitized sheet showing in dotted lines the points of separation into units.

Depending from box-like enclosure 102 are two strap members 103 (Figs. 5 and 6). Resting vertically upon each strap member are two coiled springs 104, each of which engages a collar 105 on a stem 106 which is secured to the pressure plate 101. The pressure plate at its base may carry one or more flat springs 107 and the plate may be faced with felt as at 108. The pressure plate may carry a pointed stud 110, or a plurality of studs, for punching holes 111, Fig. 9, indicating the line of severance between exposed sections of the strip.

In the operation of the device should it be desired to enlarge from a transparent plate or film, the latter may be placed in the film holder 86. If it is a glass plate it will, of course, lie flat. If it is a film, a transparent glass may be placed over in the film holder. The film holder is then placed in the position illustrated in Figure 1, being inserted through a slot provided for the purpose in the negative frame 14 so that it will rest upon the adjusting plates 78, 78×, 79, 79× as shown in Figure 8. The adjusting handles will then be actuated to fix the proper distance between the negative and the sensitized sheet 21, and also the position of the lens relatively to both the negative and the sensitized sheet. If a print of the same size as the negative-image is required, the lens will be adjusted so that it occupies a medium point. If reduction is desired, the lens is moved away from the negative holder and toward the sensitized sheet, the indicator $a$ being moved until it comes in register with one of the indicators $b$ showing that the lens has reached a desired point. The range may be increased by actuation of crank 76, thus raising or lowering the negative frame and lamp house or illuminating frame.

The relative positions of the negative frame, lens, and sensitized sheet being adjusted and the sensitized sheet being drawn out so that it passes under the feed rolls 25, 33, lever 92 may be pressed downwardly thus causing illumination of the lamp house, or illuminating frame, as the case may be, and causing the image to be projected upwardly through the lens and upon the sensitized sheet, making exposure. If a time exposure is required, reference may be made to the time exposure clock D on the cover C, Fig. 1. The exposure having been made, a foot is placed upon pedal 48 and lever 47 is pushed down. This causes movement of cable 40 and rack 38 acts to rotate feed roll 33 and cause the exposed portion of the strip to move toward the knife 52. Through the connections between lever 92 and pressure plate 101, the latter will be brought down upon the sensitized strip over the image opening 4 at the instant of exposure so that the paper will be held firmly. By repeated depressions of switch lever 92 followed by pressure upon foot pedal 48 and subsequent operation of the knife 52, successive exposures may be made and each exposed section will be severed as on the dotted lines 113, Fig. 9, the punches 110 indicating the line of severance by the holes 111.

A counter 114 may be fixed to box 102 and have a projection 115 lying under switch lever 92 so that each time the switch is depressed the counter mechanism will be actuated. If desired, pressure plate 101 may carry a stamp or printing member 116 which, in the form shown in Figure 5, is a roll. The roll may be made rotatable on a shaft to print any desired number or numbers upon the exposed sections of the strip, and' inasmuch as such mechanism forms no part of the present invention but is in general use, detailed showing thereof is not made.

Cover C, as above explained, may be light-proof, and the film may pass from the table through a channel 117 which may be shielded with velvet if required.

The exposed sections of a strip may be received in a light-tight receptacle for removal to the dark room for development, or any other means may be employed for insuring that the exposed strips do not become light-struck prior to development.

In the use of "positype" paper, that is to say paper upon which an image may be projected and which, by chemical process will be so acted upon as to reverse the image, changing it from a negative to a positive, a positive print placed in the illuminating frame will enable the production of a light positive print on the paper strip 21. If, however, a negative is projected from the negative frame, it will appear as a negative on the positype strip 21, and the developed section of the strip, bearing the image, may be placed below the lens in illuminating frame 12 and, by projection through the lens, produce a positive on the succeeding section of strip 21. If a narrow strip bearing a picture or pictures on paper or other curling material is to be reproduced, it may be pushed into a slot 118 in the holder 119 until the image appears at the opening 120. The base of member 119 may be formed with finger holes 121 for convenient manipulation of the strip.

Having described my invention, what I claim and desire to secure by Letters Patent is as follows:—

1. In a device of the character described, a lens and a mounting therefor, a bellows at each side of the lens and connected to its mounting, a support for carrying the image holding unit to be reproduced, means for throwing a light upon said unit, a support for a sensitized sheet, said support having an image aperture communicating with one of said bellows, a set of opposed brackets for carrying the lens mounting, a second set of opposed brackets for carrying said support, a frame and a rack carried thereby, a pinion and rotating means therefor carried by each bracket, said means comprising a shaft carrying the pinion, a second pinion on said shaft, a screw engaging the second pinion and an operating handle for the screw, the pinions engaging the rack, whereby rotation of the pinions will cause the brackets and the pinion rotating means to be given bodily movement for adjustment of the bellows at either side of the lens.

2. In a device of the character described, a lens and a mounting therefor, a bellows at each side of the lens and connected to its mounting, a support for carrying the image holding unit to be reproduced, means for throwing a light upon said unit, a support for a sensitized sheet, said support having an image aperture communicating with one of said bellows, means for feeding the sheet including a roll frictionally engaging the sheet, a pinion loosely carried by the roll, a spring engaged ratchet device operatively connecting the pinion with the roll when the pinion is moved in a given direction, a horizontal rack engaging the pinion, the rack being endwise movable, means for moving the rack in one direction and a spring for restoring the rack to an initial position, a set of opposed brackets for carrying the lens mounting, a second set of opposed brackets for carrying said support, a frame and a rack carried thereby, a pinion and rotating means therefor carried by each bracket, the pinions engaging the rack, whereby rotation of the pinions will cause the brackets and the pinion rotating means to be given bodily movement for adjustment of the bellows at either side of the lens.

In testimony whereof, I have signed my name to this specification.

MISCHA KOUSMINSKY.